US006668004B2

United States Patent
Peterson

(10) Patent No.: US 6,668,004 B2
(45) Date of Patent: Dec. 23, 2003

(54) WEDGE-SHAPED MICRORESONATOR AND ASSOCIATED MICROLASER ASSEMBLY

(75) Inventor: Brian Lee Peterson, Charlotte, NC (US)

(73) Assignee: Litton Systems, Inc., Los Angeles, CA (US)

( * ) Notice: Subject to any disclaimer, the term of this patent is extended or adjusted under 35 U.S.C. 154(b) by 181 days.

(21) Appl. No.: 09/927,205

(22) Filed: Aug. 10, 2001

(65) Prior Publication Data

US 2002/0021722 A1 Feb. 21, 2002

Related U.S. Application Data

(60) Provisional application No. 60/224,933, filed on Aug. 11, 2000.

(51) Int. Cl.[7] .................................................. H01S 3/11
(52) U.S. Cl. ............................................ 372/92; 372/94
(58) Field of Search .............................. 372/10, 92, 94, 372/100

(56) References Cited

U.S. PATENT DOCUMENTS

| | | | | | |
|---|---|---|---|---|---|
| 4,955,034 | A | * | 9/1990 | Scerbak ........................ | 372/94 |
| 5,394,413 | A | | 2/1995 | Zayhowski | |
| 5,790,583 | A | * | 8/1998 | Ho ................................ | 372/92 |
| 5,825,799 | A | * | 10/1998 | Ho et al. ....................... | 372/92 |
| 5,825,802 | A | * | 10/1998 | Elkins et al. ................. | 372/100 |
| 6,002,704 | A | * | 12/1999 | Freitag et al. ................ | 372/94 |
| 6,072,815 | A | | 6/2000 | Peterson | |
| 6,219,361 | B1 | | 4/2001 | Guch et al. | |
| 6,501,772 | B1 | * | 12/2002 | Peterson ....................... | 372/10 |

OTHER PUBLICATIONS

U.S. patent application Ser. No. 09/337,432, Peterson, filed Jun. 21, 1999.
J.J. Zayhowski, et al., *Miniature Gain–Switched Lasers*, presented at the Advanced Solid State Lasers 2001 conference in Seattle, Washington on Jan. 29–31, 2001.

* cited by examiner

*Primary Examiner*—Paul Ip
*Assistant Examiner*—Tuan Nguyen
(74) *Attorney, Agent, or Firm*—Alston & Bird LLP

(57) ABSTRACT

A wedge-shaped microresonator is provided that can be mounted proximate one or more wedge-shaped electro-optic components in order to construct a densely packed microlaser assembly. The wedge-shaped microresonator has first, second and third side surfaces. The wedge-shaped microresonator includes a passive Q-switch proximate the second side surface and an active gain medium proximate portions of the first and third side surfaces. The wedge-shaped microresonator also includes a reflective surface proximate each of the first, second and third side surfaces. At least one of the reflective surfaces is partially reflective, however, to then permit emission of laser signals. In addition to the wedge-shaped microresonator, a microlaser assembly is provided that also includes at least one wedge-shaped electro-optic component for receiving and modifying the laser pulses emitted by the wedge-shaped microresonator. As a result of the wedge-shape of the microresonator and the electro-optic components, the microlaser assembly can be packed relatively densely.

20 Claims, 5 Drawing Sheets

WEDGE-SHAPED MICRORESONATOR AND ASSOCIATED MICROLASER ASSEMBLY

CROSS REFERENCE TO RELATED APPLICATION

The present application claims priority from U.S. Provisional Patent Application Ser. No. 60/224,933 filed Aug. 11, 2000 by Brian Lee Peterson, the contents of which are incorporated herein in their entirety.

FIELD OF THE INVENTION

The present invention relates generally to Q-switched microresonators and, more particularly, to densely packed microlaser assemblies including Q-switched microresonators.

BACKGROUND OF THE INVENTION

Modern electro-optical applications are demanding relatively inexpensive, miniaturized lasers capable of producing a series of well-defined output pulses. As such, a variety of microlasers have been developed that include a microresonator and a pair of at least partially reflective mirrors disposed at opposite ends of the microresonator to define a resonant cavity therebetween. The microresonator of one advantageous microlaser includes an active gain medium and a saturable absorber that serves as a Q-switch. See, for example, U.S. Pat. No. 5,394,413 to John J. Zayhowski which issued on Feb. 28, 1995 and U.S. Pat. No. 6,072,815 to Brian L. Peterson which issued on Jun. 6, 2000, the contents of both of which are incorporated in their entirety herein. By appropriately pumping the active gain medium, such as with a laser diode, the microresonator will emit a series of pulses having a predetermined wavelength, pulse width and pulse energy.

Conventional microlasers, such as those described by U.S. Pat. No. 5,394,413, are end pumped in a direction parallel to the longitudinal axis defined by the resonator cavity. In this regard, the longitudinal axis of the microresonator cavity extends lengthwise through the resonator cavity and is oriented so as to be orthogonal to the pair of at least partially reflective mirrors that define the opposed ends of the resonant cavity. As such, conventional microlasers are configured such that the pump source provides pump signals in a direction perpendicular to the at least partially reflective mirrors that define the opposed ends of the resonant cavity. The effective length of the resonator cavity is therefore equal to the physical length of the resonator cavity.

In order to increase the pulse energy and the average power of the laser pulses, the resonator cavity of a microlaser is preferably lengthened. While a microlaser can be fabricated such that the resonator cavity has different lengths, a number of factors contribute to generally limit the permissible length of the resonator cavity. In particular, a number of electro-optical applications require microlasers that are extremely small. In addition, the length of passively Q-switched microlasers is effectively limited by the requirement that the inversion density must exceed a predetermined threshold before lasing commences. As the physical length of the resonator cavity increases, greater amounts of pump energy are therefore required in order to create the necessary inversion density for lasing.

In order to effectively increase the length of the resonant cavity without increasing its physically length, side-pumped microlasers have been developed as described by U.S. patent application Ser. No. 09/337,432, filed Jun. 21, 1999, by Brian L. Peterson, et al. and U.S. Pat. No. 6,219,361, issued Apr. 17, 2001 to Steve Guch, Jr., et al., the contents of both of which are incorporated in their entireties herein. Like an end-pumped microlaser, a side-pumped microlaser includes a microresonator consisting of an active gain medium and a saturable absorber that serves as a Q-switch, and a pair of at least partially reflective mirrors disposed at opposite ends of the microresonator to define a resonant cavity. Unlike an end-pumped microlaser in which the opposed end faces of the microresonator are perpendicular to the longitudinal axis defined by the microresonator, however, the opposed end faces of the microresonator of a side-pumped microlaser are disposed at a non-orthogonal angle, such as between about 30° and about 35°, relative to a line perpendicular to the longitudinal axis defined lengthwise through the microresonator. As such, the microresonator will support a zig-zag resonation pattern. In order to initiate the resonation, the microlaser also includes a pump source for introducing pump signals into the active gain medium via a side surface of the microresonator. In response to the pumping of the active gain medium via the side surface, the zig-zag resonation pattern is established within the resonant cavity and a series of pulses are emitted once the necessary inversion density has been reached. As a result of the zig-zag resonation pattern, the effective length of the microresonator of a side-pumped microlaser is increased without having to increase the physical dimensions. Thus, a side-pumped microlaser can generate pulses having greater pulse widths and correspondingly greater pulse energies and average power levels than the pulses provided by end-pumped microlasers of a similar size.

Notwithstanding the advantages offered by side-pumped microlasers, some modern electro-optic applications require pulses that have greater pulse energies and greater average power levels as well as pulses that have different frequencies or wavelengths than those emitted by a microresonator. As such, microlaser assemblies can include one or more electro-optic components in addition to microresonator for receiving and modifying the pulses. For example, the electro-optic components can include an optical parametric amplifier or an optical parametric oscillator. Alternatively, the electro-optic optic components can include one or more non-linear crystals for altering the wavelength of the pulses, such as by doubling or quadrupling the frequency of the pulses.

While the additional electro-optic components modify the pulses emitted by microresonators so as to have the desired amplitude, frequency or other signal characteristics, the addition of the electro-optic components increases the size of the resulting microlaser assembly. With many electro-optic applications, it is desirable to minimize the size of the microlaser assembly. As such, it would be advantageous to configure the microresonator and the other electro-optic components of the microlaser assembly as densely as possible. This dense packing of the components of a microlaser assembly presents additional challenges, however, including the accurate alignment of the microresonator and the electro-optic components and the thermal management of the components. In this regard, the dense packing of the components can exacerbate the loss or other attenuation caused by misalignment. In addition, the heat generated by the plurality of closely packed electro-optic components is generally more concentrated and must be transferred to a heat sink, a thermoelectric cooler or the like in order to maintain the electro-optic components at a predetermined operating temperature.

SUMMARY OF THE INVENTION

A wedge-shaped microresonator is therefore provided that can be mounted proximate one or more electro-optic components in order to construct a densely packed microlaser assembly. The microresonator includes at least a pair of converging side surfaces that define an acute angle therebetween. In this regard, the wedge-shaped microresonator has first, second and third side surfaces. The wedge-shaped microresonator includes an active gain medium having a wedge shape and a passive Q-switch proximate at least one side surface. For example, the passive Q-switch may be proximate the second side surface and the active gain medium may be proximate portions of the first and third side surfaces. The wedge-shaped microresonator also includes a reflective surface proximate each of the first, second and third side surfaces. At least one of the reflective surfaces, typically the reflective surface that is proximate the second side surface, i.e., proximate the passive Q-switch, is partially reflective to permit emission of laser signals.

In addition to the wedge-shaped microresonator, a microlaser assembly according to one aspect of the present invention also includes at least one electro-optic component for receiving and modifying the laser pulses emitted by the wedge-shaped microresonator. In one advantageous embodiment, both the microresonator and the at least one electro-optic component are wedge-shaped. As such, the microresonator and the electro-optic component(s) may be arranged in a ring-like configuration. As a result of the wedge-shape of the microresonator and the electro-optic components, the microlaser assembly can be packed relatively densely. Moreover, the wedge shape of the components of the microlaser assembly facilitates the precise alignment of the microresonator and the other electro-optic components. In one embodiment, the microlaser assembly further includes an auxiliary electro-optic component for receiving an output from either the microresonator or another electro-optic component. The auxiliary electro-optic component may be radially offset from the ring-like arrangement of the microresonator and the electro-optic component (s). The microlaser assembly may include a wide variety of electro-optic components including optical parametric oscillators, optical parametric amplifiers, frequency altering components, such as frequency doubling crystals or the like, gain switched resonators and active gain mediums.

Regardless of whether the microlaser assembly includes other electro-optic components, the microlaser assembly generally includes a pump source for providing pump signals to the microresonator. In one advantageous embodiment, the pump source includes a plurality of pump sources arranged to pump the microresonator in a triangular pattern. In this regard, the plurality of pump sources may be arranged such that the triangular pattern extends between medial portions of the first, second and third side surfaces of the microresonator. In addition, the microresonator and the pump sources can be mounted upon a heat sink that serves to maintain the temperature of the microresonator and the pump sources within a predefined range during operation of the microlaser assembly. In one embodiment, for example, the heat sink is positioned between the pump sources and the microresonator. In this exemplary embodiment, the heat sink defines at least one opening therethrough such that the pump sources may be positioned relative to the heat sink so as to provide pump signals through respective openings to the microresonator. For example, the heat sink may define openings in the triangular pattern in which the microresonator is to be pumped. Regardless of the particular configuration, the microlaser assembly including the wedge-shaped microresonator of the present invention can be reliably operated to produce laser signals having the desired signal characteristics, while also permitting the components to be densely packed.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
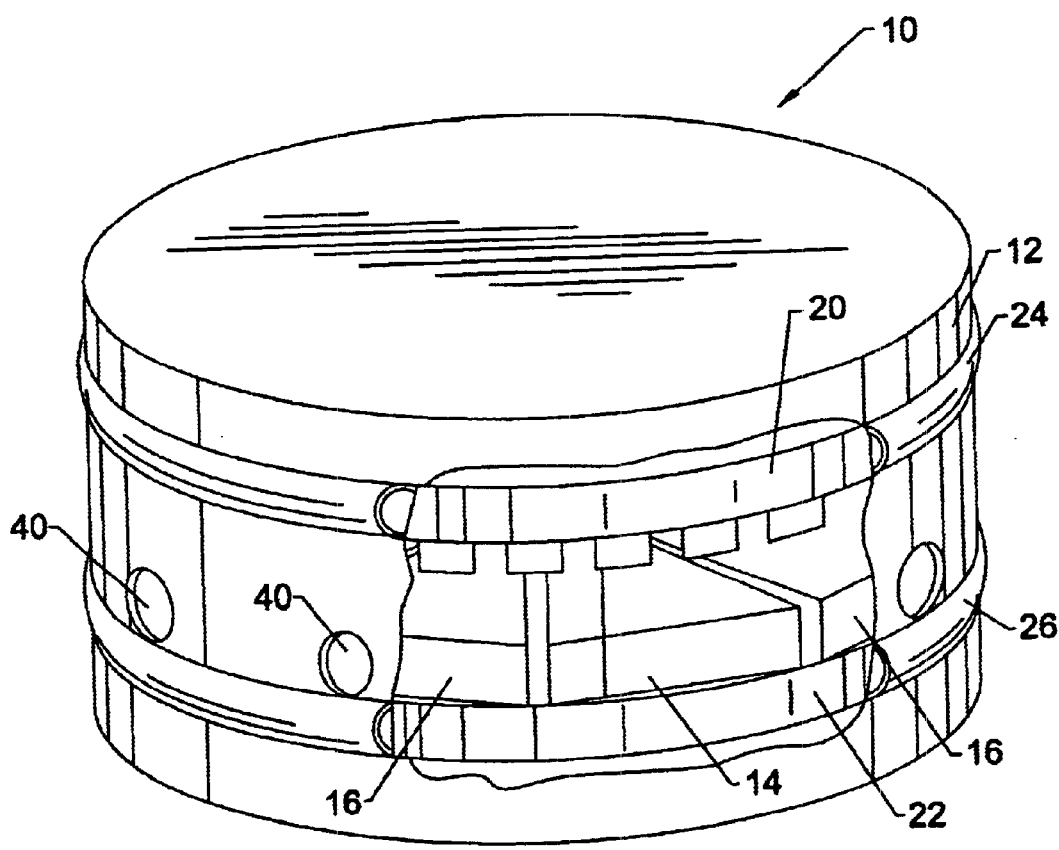
FIG. 1 is a perspective view of a microlaser assembly according to one advantageous embodiment of the present invention in which a portion of the housing has been removed to depict the internal components.
Figure 2:
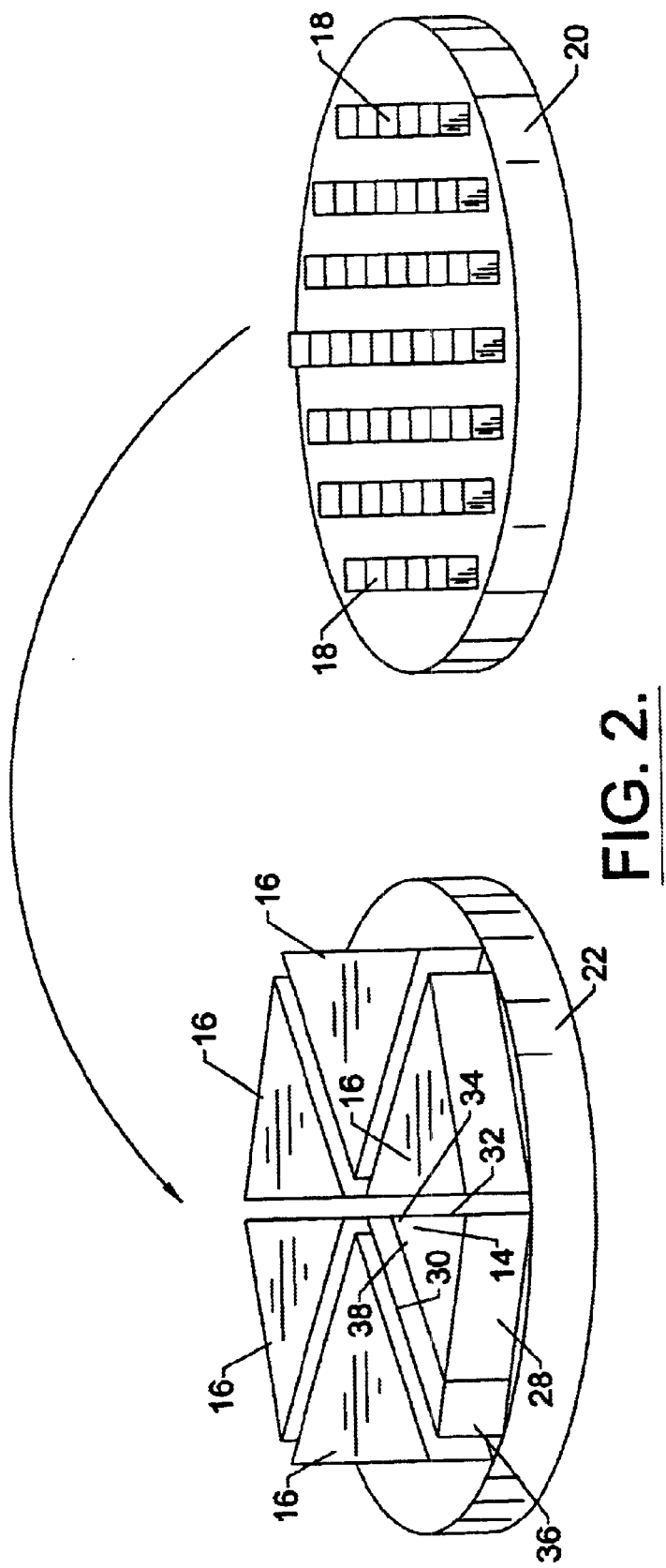
FIG. 2 is a perspective view of a pump source mounted upon a first heat sink and a wedge-shaped microresonator and a plurality of wedge-shaped electro-optic components mounted upon a second heat sink according to one embodiment of the present invention.

Referring now to FIG. 1, a microlaser assembly 10 according to one advantageous embodiment of the present invention is illustrated. As depicted, the microlaser assembly includes a housing 12 which, in the illustrated embodiment, has a cylindrical configuration, although the housing can be constructed in other configurations, if so desired. Within the housing, the microlaser assembly includes a microresonator 14 and one or more electro-optic components 16 positioned so as to receive and modify the laser signals emitted by the microresonator. In order to initiate resonation by the microresonator, the microlaser assembly can also include a pump source 18, such as one or more laser diode pump arrays 19, as depicted in FIG. 2. The microlaser assembly can also include first and second heat sinks 20, 22 upon which the pump source and the combination of the microresonator and the electro-optic components are mounted, respectively. It will be understood by those having skill in the art that an element or component that is described as being "on" or "mounted upon" another element may be either mounted directly on the underlying element or may merely overlie the other element with one or more intervening layers or elements being disposed therebetween. It should also be understood by those skilled in the art that the pump source and the combination of the microresonator and the electro-optic components may be mounted upon a common heatsink, if so desired. In one advantageous embodiment, the microlaser assembly may also include first and second coolers 24, 26, such as impingement coolers, in thermal contact with a respective heat sink so as to remove thermal energy collected by the heat sink.

As a result of the wedge-shape of the microresonator 14 and the other electrooptic components 16, the microlaser assembly 10 can be densely packed. However, the construction of the microlaser assembly also permits the microresonator and the other electro-optic components to be precisely aligned, thereby minimizing signal loss or attenuation. In addition, the microlaser assembly permits thermal energy to be transferred to the second heat sink 22 so as to maintain the microresonator and the other electro-optic components at a desired operating temperature.

As shown in more detail in FIG. 2, the microresonator 14 is wedge-shaped and, as a result, has first, second and third side surfaces 28, 30, 32, each of which is typically planar. Each adjacent pair of side surfaces converge so as to define an acute interior angle therebetween. In the illustrated embodiment, for example, the interior angle defined between each pair of adjacent sides is equal and is therefore 60°. However, the wedge-shaped microresonator can be shaped differently such that different angles are defined between each pair of the adjacent side surfaces in order to alter the resonation pattern within the microresonator and/or the direction in which the laser signals are emitted from the microresonator. Although the microresonator of the illustrated embodiment includes three pointed vertices at which adjacent pairs of the side surfaces intersect, any one or all of the vertices may be truncated while still considering the microresonator to be wedge-shaped. Thus, the wedge-shape of the microresonator of the present invention merely contemplates that at least a pair of side surfaces converge to define an acute interior angle. Additionally, the side surfaces need not be planar, but may have other configurations. For example, one or more of the side surfaces, such as the first side surface 28, may be arcuate or the like.

Figure 3:
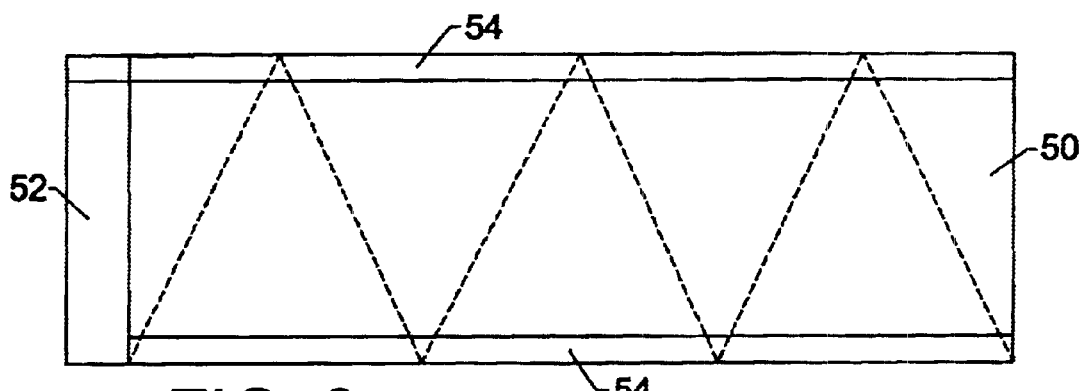
FIG. 3 is a plan view depicting a structure fabricated by liquid phase epitaxy which may be divided into a plurality of microresonators according to one embodiment of the present invention.

As shown in FIG. 2, the microresonator 14 has a wedge-shaped active gain medium 34 and a Q-switch 36, such as a passive Q-switch, that is preferably immediately adjacent to at least one side surface of the active gain medium. The microresonator of one advantageous embodiment is fabricated by epitaxially growing the active gain medium upon the Q-switch or visa versa, typically pursuant to a liquid phase epitaxy process. As shown in FIG. 3, multiple microresonators can be fabricated in a batch process by epitaxially growing the active gain medium material 50, such as neodymium doped YAG, upon an undoped substrate 52, such as an undoped YAG substrate, and then epitaxially growing the Q-switch material 54, such as tetravalent chrome doped YAG, upon the opposite sides of the active gain medium material. The resulting rectangularly-shaped structure may then be divided or separated into a plurality of wedge-shaped microresonators, as indicated by the dashed lines in FIG. 3. The layer of the Q-switch material that extends along an entire side surface will serve as the passive Q-switch for the resulting microresonator, while the small portion of the Q-switch material proximate the opposed tip of the microresonator is generally unused since the resonation pattern established within the microresonator does not typically extend through the tip. Thus, the tip may actually be truncated or separated, if so desired. While the batch fabrication process is advantageous, the microresonator can be fabricated in other manners without departing from the spirit and scope of the present invention. For example, the active gain medium and the Q-switch can be joined by a diffusion bond or by optical contact in which the active gain medium and the Q-switch are attracted with coherent forces, such as Van der Waals forces.

Figure 4:
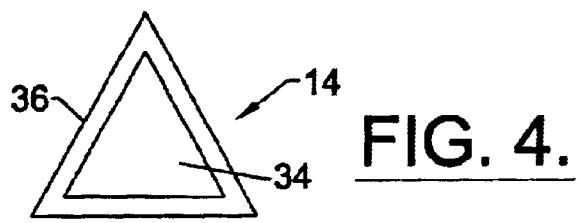
FIG. 4 is a plan view of a microresonator according to another embodiment of the present invention in which the passive Q-switch is proximate each of the first, second and third side surfaces of the active gain medium.

As shown in FIG. 2, the Q-switch 36 of the illustrated embodiment is proximate the second side surface 30 while the active gain medium 34 is proximate portions of the first and third side surfaces 28, 32 and is spaced from the second side surface by the passive Q-switch. However, the Q-switch can be proximate a different and/or additional side surfaces of the microresonator 14, if so desired. As shown in FIG. 4, for example, the passive Q-switch may be formed proximate each side surface of the active gain medium, such as by epitaxially growing the Q-switch material on each side surface of the active gain medium pursuant to a liquid phase epitaxy process so as to completely encircle the active gain medium.

Both the Q-switch 36 and the active gain medium 34 are formed of an appropriately doped host material. Typically, the host material is yttrium aluminum garnet (YAG), although materials such as yttrium vanadate ($YVO_4$) and yttrium lithium fluoride (YLF), can be employed. In addition, while a variety of dopants can be utilized, the active gain medium is typically doped with neodymium (Nd) and the saturable absorber is typically doped with tetravalent chrome ($Cr^{4+}$). In one advantageous embodiment, for example, the active gain medium is formed of YAG that is doped with between about 2 and about 3 atomic percent of Nd. In this embodiment, the Q-switch or saturable absorber is also formed of YAG and is doped with tetravalent chrome so as to have an optical density of 0.03 to 0.1. As will be apparent, however, the active gain medium and the saturable absorber can be doped with different atomic percentages and different types of dopant without departing from the spirit and scope of the present invention. In addition, while the passive Q-switch is preferably immediately adjacent the active gain medium, the microresonator may include on or more intervening layers, if so desired.

Regardless of the material selection, the saturable absorber serves as a Q-switch 36 to prevent the onset of lasing until the inversion density within the microresonator 14 is sufficiently high, i.e., above a predetermined threshold. Once lasing begins, however, the microresonator will produce a series of pulses of a predetermined wavelength, i.e., the lasing wavelength, that have a predetermined pulse width, albeit a longer pulse width than the laser pulses generated by conventional microlasers.

The microlaser assembly 10 also includes a reflective surface disposed proximate each of the side surfaces 28, 30, 32 to define a microresonator cavity therebetween. The reflective surfaces can consist of a multi-layered dielectric coating that is deposited upon the side surfaces. Alternatively, the reflective surface can be formed by dichroic mirrors that are positioned proximate, but slightly spaced from respective ones of the side surfaces.

At least one of the reflective surfaces is only partially reflective to signals having the predetermined lasing wavelength in order to permit laser pulses to be output. In embodiments in which laser pulses are to be output through the second side surface 30 proximate the passive Q-switch 36, the reflective surface proximate the second side surface is partially reflective while the reflective surfaces proximate the first and third side surfaces 28, 32 are highly reflective for signals having the predetermined lasing wavelength. Alternatively, the microlaser assembly 10 may be designed such that the microresonator 14 emits laser signals via the first or third side surfaces such that the laser signals can be directed to other electro-optic components 16. The reflective surfaces can be tailored to have any desired reflectivity. For example, the reflective surface having a high reflectivity typically has a reflectivity of greater than 99.5% for signals having a predetermined lasing wavelength, such as 1.06 nanometers for a microresonator having an active gain medium formed of Nd-doped YAG. Conversely, a reflective surface that is only partially reflective typically has a reflectivity of between 40% and about 90% for signals having the predetermined lasing wavelength. See also U.S. Pat. No. 5,394,413 that further describes a pair of mirrors that define the resonant cavity of a microlaser.

In operation, the active gain medium 34 is pumped and once the inversion density within the microresonator 14 is above the predetermined threshold, the passive Q-switch 36 will permit a series of pulses to be emitted. In particular, the series of pulses will be emitted through the reflective surface that is only partially reflective.

In order to pump the active gain medium 34 with pump signals, the microlaser assembly 10 also includes a pump source 18. In one advantageous embodiment, the microresonator 14 is side pumped. In this regard, the microresonator has a first end surface 38. By positioning the pump source such that the pump signals are delivered via the first end surface of the microresonator, the active gain medium is effectively side pumped. While the microlaser can be pumped via a single end surface, the microlaser can, instead, be advantageously pumped via both opposed end surfaces, if so desired.

Although the wavelength of the pump signals can be tailored to the specific materials that comprise the active gain medium 34, an active gain medium that is comprised of Nd doped YAG is typically pumped with pump signals having a wavelength of 808+/−3 nanometers. In order to permit the pump signals to be received by the active gain medium without being reflected from the first end surface 38, the microresonator 14 generally includes an antireflection coating deposited upon the first end surface to permit signals having the wavelength of the pump signals to enter the microresonator with little, if any, reflection. In embodiments in which the microresonator is only pumped via the first end surface, the second end surface is preferably coated with a reflectance coating that has a high reflectivity, such as a reflectivity of greater than 99.5%, for signals having the wavelength of the pump signals. While the reflectance and/or antireflection coatings deposited upon the first and second end surfaces can be formed in a variety of manners, the reflectance and/or antireflection coatings are typically formed by the deposition of a plurality of dielectric layers having respective indices of refraction that are tailored to provide the proper reflectivity properties as known to those skilled in the art.

While the microlaser assembly 10 can include a variety of pump sources 18, the microlaser assembly of one advantageous embodiment utilizes one or more linear laser diode pump arrays that are preferably positioned within the housing 12 so as to illuminate the first end surface 38 of the microresonator 14. The linear laser diode pump arrays are typically driven by means of current provided by conductors or leads that have not been depicted for the purposes of clarity, but that are well understood by those skilled in the art.

In one embodiment, for example, a plurality of linear laser diode pump arrays are mounted upon a first heat sink 20, typically comprised of oxygen-free high conductivity copper or some other material, such as a silver base plated with an alloy of gold and nickel, that is highly thermally conductive, by means of a thermally conductive solder or epoxy, such as an aluminum oxide filled or silver filled epoxy. As an alternative to the passive heat sinks described above, the first heat sink, as well as the second heat sink, may be an active heat sink or heat pump, such as a Peltier heat pump or other thermoelectric cooler. As used herein, the term "heat sink", as used in conjunction with either the first or second heat sinks, includes not only heat sinks that cool components by accepting waste heat, but also heat pumps that generate additional heat in order to warm a component.

The first heat sink 20 can then be mounted within the housing 12 such that the laser diode pump arrays face the microresonator 14 and the other electro-optic components 16. By utilizing laser diode pump arrays, the energy delivered via the pump signals is increased dramatically relative to the energy provided by the pump signals of a single stripe laser diode that is typically utilized to end pump conventional microlasers. For example, a linear laser diode array having a length of about 1 cm generally provides pump signals having an average pump power of 15–40 watts, as compared to the 1–3 watts of average pump power provided by the pump signals of a single stripe laser diode.

As shown in FIG. 2, the plurality of pump sources 18 may be arranged in rows so as to pump the active gain medium 34 of a microresonator 14 in a relatively uniform manner across this entire end surface 38. While this type of pumping is effective for pumping the active gain medium, this type of pumping generally generates multi-mode signals. If the microresonator of this embodiment is to emit single mode signals, instead, the heat sink 22 upon which the microresonator is mounted could be an active heat sink, such as an impingement cooler, that is controlled in such a manner as to alter the index of refraction of the active gain medium in a controlled and non-uniform manner such that single mode operation is achieved.

Figure 7:
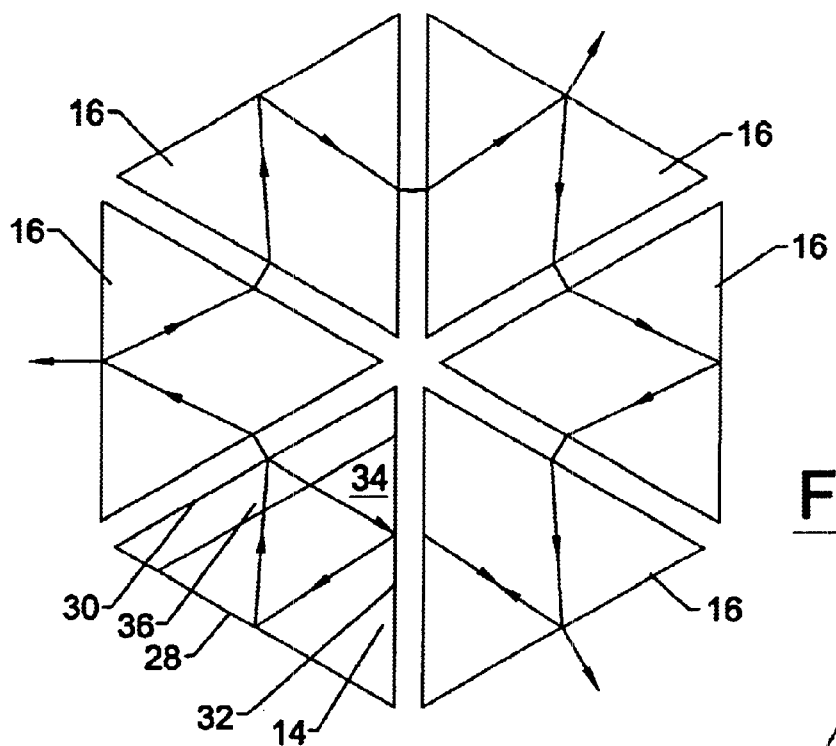
FIG. 7 is a top plan view of a wedge-shaped microresonator and a plurality of wedge-shaped electro-optic components that depicts the resonation pattern of the laser signals established by the pump sources depicted in FIGS. 5 and 6 according to one embodiment of the present invention.

Alternatively, the pump sources 18 may be arranged in a different manner so as to more precisely define the resonation pattern established within the microresonator 14 such that single mode operation is achieved. In this regard, the pump sources may be arranged to establish a triangularly-shaped resonation pattern that extends between medial portions of each of the side surfaces as depicted in FIG. 7. As a result of the partially reflective mirror disposed upon the second side surface 30 proximate the Q-switch 36, single mode laser signals are emitted via the second side surface while the microresonator continues to resonate in accordance with the triangularly-shaped pattern. In order to establish the triangularly-shaped resonation pattern, the pump sources are also preferably arranged in the same triangular shape so as to preferentially pump those portions of the active gain medium that lie along the triangularly shaped resonation pattern depicted in FIG. 7.

Figure 5:
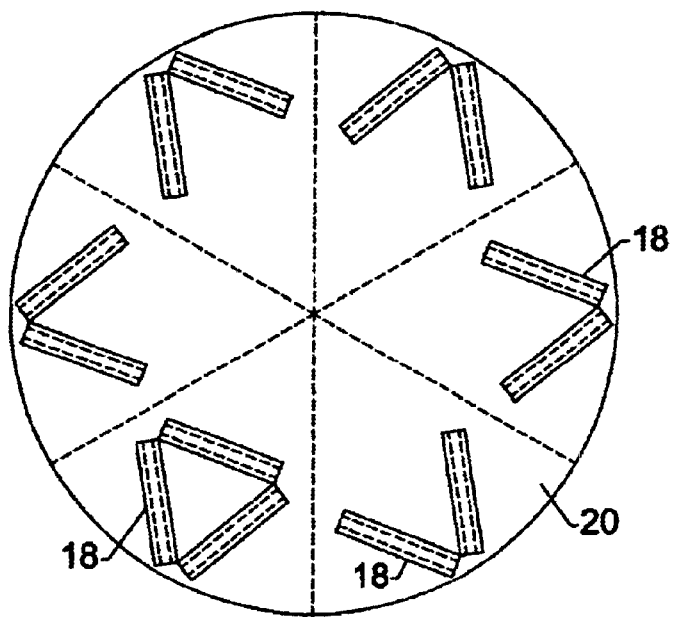
FIG. 5 is a plan view of a heat sink carrying a plurality of pump sources arranged to generate a predetermined resonator pattern according to another embodiment of the present invention.
Figure 6:
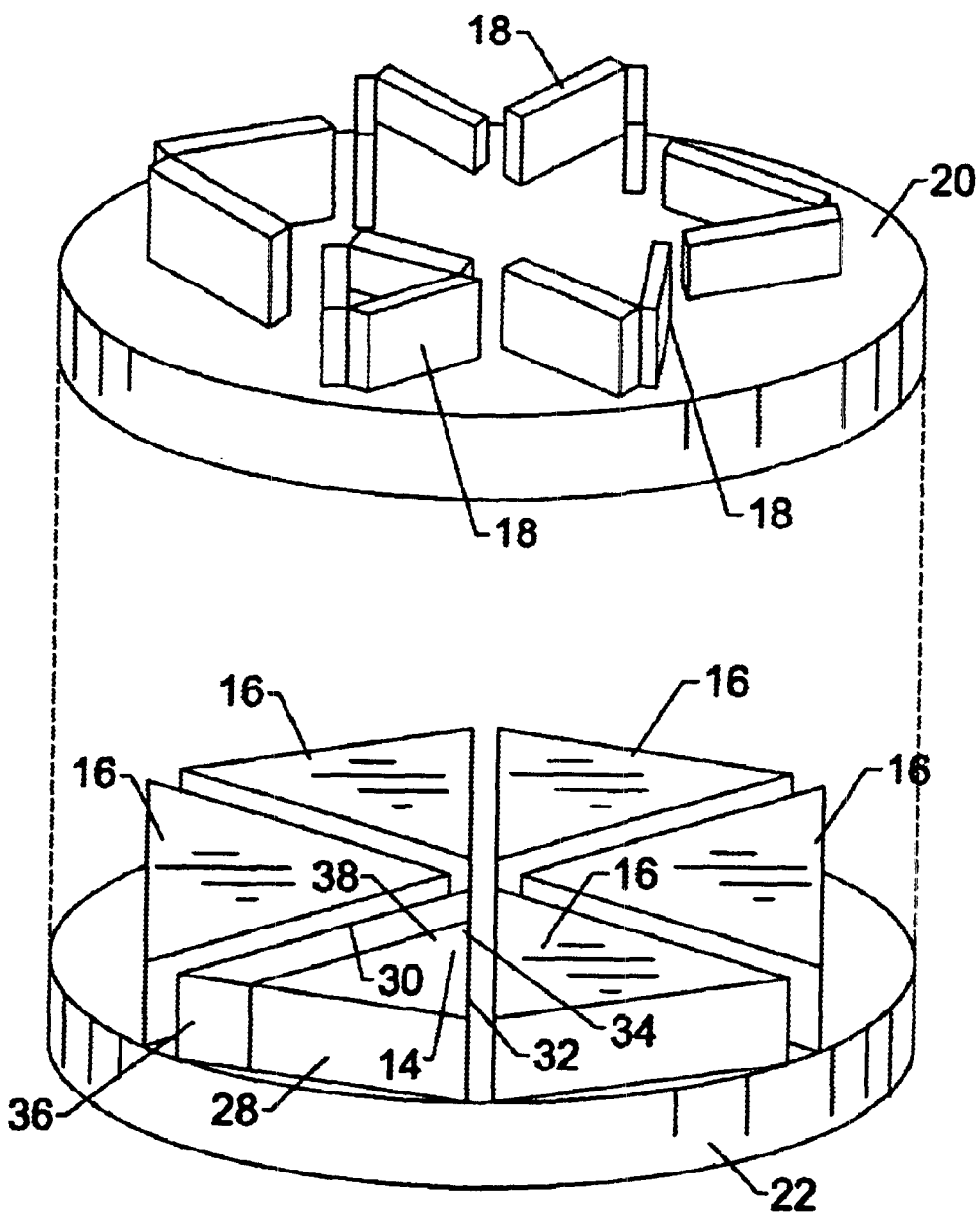
FIG. 6 is an exploded perspective view of portions of a microlaser assembly according to another embodiment of the present invention including the heat sink and pump source subassembly of FIG. 5 and a corresponding, aligned subassembly including a microresonator and a plurality of electro-optic components mounted upon a heat sink.

In one embodiment, the plurality of pump sources 18 are mounted upon a heat sink 20 in such a manner so as to overlie the microresonator 14 and to define the triangularly-shaped pattern. While the pump sources may be mounted upon the heat sink in a variety of arrangements, including a comparable arrangement to that depicted in FIG. 2, the heat sink of one advantageous embodiment defines a plurality of openings depicted with dotted lines in FIG. 5 in the same pattern as the resonation pattern to be established within the microresonator. Thus, the pump sources may be mounted upon the surface of the heat sink that is opposite the microresonator in a manner aligned with respective openings defined by the heat sink as shown in FIGS. 5 and 6. As described above, the pump sources are typically mounted to the heat sink by means of a thermally conductive solder or epoxy, such as an aluminum oxide filled or silver filled epoxy. As a result of the alignment of the pump sources with respective openings, the pump signals delivered by the pump sources are transmitted through respective openings for impingement upon the microresonator. As a result of the pattern of openings defined by the heat sink and the arrangement of the pump sources thereupon, the active gain medium of the microresonator is preferably pumped in a triangular pattern that establishes the triangular resonation pattern that advantageously generates single mode laser signals.

As described above, the resonation pattern established within the microresonator cavity in response to pumping of the active gain medium 34 may have a triangular shape extending from the first side surface 28 to the second side surface 30 to the third side surface 32 to the first side surface and then around again as depicted in FIG. 7. By altering the shape of the microresonator in order to change the interior angles defined by the side surfaces of the microresonator and/or by altering the manner in which the active gain medium is pumped, however, the resonation pattern may be V-shaped by extending from the second side surface to the first side surface to the third side surface and back again.

In either embodiment, the resonation pattern is advantageously relatively long in comparison to the physical dimensions of the microresonator 14. In this regard, the effective length of the resonation pattern is defined by the path of the signals as the signals internally reflect from the various side surfaces of the microresonator. As a result of the length of the resonation pattern, the pulse width or pulse duration of the pulses output by the microresonator are relatively long for the physical dimensions of the microresonator. In addition, the energy delivered by the pulses output by the microresonator should be relatively large for the size of the microresonator.

In addition to the microresonator 14, the microlaser assembly 10 of the present invention includes one or more electro-optic components 16 positioned downstream of the microresonator in an aligned relationship thereto. As shown in the FIGS. 1 and 2, the microresonator and the other electro-optic components can also be mounted upon a common heat sink, herein referenced as a second heat sink 22. Alternatively, the microresonator and the other electro-optic components can be mounted upon different heat sinks or a segmented heat sink if it is desired to maintain the microresonator and the other electro-optic components at different or otherwise independent temperatures. According to one embodiment, the heat sink is an oxygen free high conductivity copper heat sink. However, the heat sink can be any of a variety of active or passive heat sinks including thermoelectric coolers and the like. Still further, while the microresonator and the electro-optic components are depicted to be separate components, the microresonator and the electro-optic components can be integrally formed from the same substrate, if so desired.

As depicted in FIG. 2, the microlaser assembly 10 has a plurality of electro-optic components 16 positioned downstream of the microresonator 14 for receiving and modifying the laser signals emitted by the microresonator. The microlaser assembly can include different types of electro-optic components depending on the application and the manner in which the laser signals are to be modified. For example, the microlaser assembly can include a frequency altering component, such as a frequency doubling crystal, typically formed of $KTiOPO_4$, i.e., KTP. By way of example, in the embodiment in which a microresonator having an active gain medium 34 formed of neodymium-doped YAG and a saturable absorber 36 formed of tetravalent chrome-doped YAG emits laser pulses having a wavelength of 1.064 nanometers, the KTP crystal will double the frequency of the laser pulses such that the resulting laser pulses have a wavelength of 532 nanometers.

In addition, the microlaser assembly 10 can include other frequency altering components, such as a fourth harmonic generator, typically formed of barium borate (BBO), disposed downstream of the frequency doubling crystal in order to generate a fourth order output. Accordingly, a microlaser assembly that includes a microresonator 14 having an active gain medium 34 formed of neodymium-doped YAG and a saturable absorber 36 formed of tetravalent chrome-doped YAG that emits laser pulses having a wavelength of 1.064 nanometers may include both a frequency doubling crystal and a fourth harmonic generator in order to produce laser pulses having a wavelength of 266 nanometers. Moreover, the microlaser assembly can include other types of frequency altering components comprised of nonlinear crystals or harmonic crystals, such as lithium triborate (LBO) that can serve as a second or third harmonic generator depending upon its design. Other nonlinear crystals include, but are not limited to potassium dihydrogen phosphate (KDP), lithium niobate ($LiNbO_3$), cessium triborate (CBO) and cessium lithium triborate (CLBO).

In addition to or instead of including frequency altering components for altering the frequency of the pulses provided by the microresonator 14, the microlaser assembly 10 can include an amplifier stage, such as an optical parametric amplifier, for amplifying the pulses, thereby increasing the average pulse energy and average power level of the pulses. Furthermore, the microlaser assembly can include an optical parametric amplifier and/or an optical parametric oscillator for emitting signals having a somewhat different wavelength in response to the pulses emitted by the microresonator. For example, an optical parametric amplifier or an optical parametric oscillator can emit signals having a wavelength between 1.5 and 4.5 $\mu$m in response to pulses emitted by the microresonator that have a wavelength of 1.064 $\mu$m. Moreover, the microlaser assembly can include another active gain medium downstream of the microresonator such that the pulses emitted by the microresonator serve to pump the other active gain medium. For example, pulses having wavelength of 1.064 $\mu$m that are emitted by the microresonator can pump another active gain medium comprised of tetravalent chrome doped YAG which, in turn, will emit pulses having a wavelength between 1.3 $\mu$m and 1.6 $\mu$m. Still further, the microlaser assembly can include a gain switched resonator, such as described by an article entitled *Miniature Gain-Switched Lasers* by J. J. Zayhowski, et al. which was presented at the Advanced Solid State Lasers 2001 conference in Seattle, Wash. on Jan. 29–31, 2001. In this regard, a gain switched resonator may be comprised of a substrate, such as YAG, that is highly doped with tetravalent chrome in order to emit signals having a wavelength between 1.35 $\mu$m and 1.6 $\mu$m with a peak emission at 1.45 $\mu$m in the response to pulses emitted by the microresonator that have a wavelength of 1.064 μm. As will be apparent, the laser signals emitted by the microlaser assembly of the present invention can therefore be tailored for many specific applications since the frequency and the average power level of the pulses can be modified by introducing appropriate electro-optic components 16 downstream of the microresonator.

At least some of the electro-optic components 16 may need to be pumped and, as such, the pump source 18 may be configured so as to also overlie some or all of the electro-optic components 16 as depicted in FIGS. 1, 2 and 6 to provide pump signals thereto. As described above in conjunction with FIGS. 5 and 6, the pump sources may be arranged relative to the other electro-optic components in order to establish a desired resonation pattern therethrough. For example, in order to establish the generally V-shaped resonation pattern depicted in FIG. 7, the pump sources may be arranged relative to the electro-optic components so as to provide pump signals that pump portions of the respective electro-optic component having the same V-shape. In the embodiment depicted in FIGS. 5 and 6, for example, the heat sink 20 may define openings that overlie those portions of the electro-optic components that are desirably pumped, such as the V-shaped regions depicted in FIG. 7. Thus, the pump sources may be mounted to the heat sink so as to overlie respective openings and to correspondingly pump the respective electro-optic components in such a manner so as to establish the desired resonation pattern, such as by pumping the V-shaped portion of each electro-optic component in order to correspondingly establish a V-shaped resonation pattern. As will be apparent, however, the pump sources may be arranged in other configurations with respect to the electro-optic components without departing from the spirit and scope of the present invention.

According to one advantageous embodiment of the present invention, each of the electro-optic components 16 is also preferably wedge-shaped such that the microresonator 14 and the electro-optic components can be fit together in a ring-like arrangement or as pieces of a pie such that the resulting microlaser assembly 10 has an extremely compact and dense configuration. In this regard, although the electro-optic component of the illustrated embodiment includes three pointed vertices at which adjacent pairs of the side surfaces intersect, any one or all of the vertices may be truncated while still considering the electro-optic component to be wedge-shaped. Thus, the wedge-shape of the electro-optic component of the present invention merely contemplates that at least a pair of side surfaces converge to define an acute interior angle. In order to support the propagation of the laser signals emitted by the microresonator through the downstream electro-optic components, each electro-optic component preferably includes reflective surfaces on its first, second and third side surfaces that are either highly or only partially reflective in order to appropriately direct the laser signals. For example, in instances in which the laser signals are received via the third side surface reflected from the first side surface and are emitted via the second side surface as depicted in FIG. 7, the reflective surfaces proximate the second and third side surfaces are only partially reflective to facilitate the transmission of the laser signals therethrough. However, the reflective surface proximate the first side surface of the electro-optic component of this embodiment would be highly reflective in order to internally reflect the laser signals.

Alternatively, in instances in which the electro-optic component 16 receives laser signals via the third side surface and emits modified laser signals via the first side surface as indicated by the arrows extending radially outward, the reflective surfaces proximate the first and third side surfaces may be partially reflective to permit the transmission of the laser signals therethrough, while the reflective surface proximate the second side surface may be highly reflective. Still further, the electro-optic component may be designed so that the laser signals are split with some laser signals being emitted via the first side surface and the remainder of the laser signals being emitted via the second side surface in order to be coupled into another downstream electro-optic component. In this embodiment which is also depicted in FIG. 7, the reflective surface proximate each of the side surfaces may be partially reflective so as to permit a predetermined percentage of the laser signals to be transmitted therethrough. For example, a predetermined percentage of the laser signals can be output via the first side surface, while the remainder of the laser signals continue to propagate through the electro-optic components in order to be further processed, such as by being further amplified or undergoing a frequency shift. In operation, therefore, the laser signals emitted by the microresonator 14 can be provided to a series of downstream electro-optic components that modify the laser signals in a desired manner. As such, the microlaser assembly 10 can produce output signals having a number of different frequencies and/or a number of different power levels, all of which are based upon the laser signals emitted by the same microresonator.

As depicted in FIG. 1, the microresonator 14 and the associated electo-optic components 16 are mounted upon a second heat sink 22 that, in turn, is mounted within the housing 12. Although the microresonator and the electro-optic components are depicted to be the same size and have the same shape, the microresonator and the electro-optic components can have different sizes, if so desired. In addition, the microresonator and the electro-optic components can be mounted upon the heat sink in a tight fit arrangement such that adjacent side surfaces of the microresonator and the electro-optic components contact one another. Alternatively, the microresonator and the electro-optic components can be mounted upon the heat sink so as to have a slight space therebetween as shown in FIG. 2. In this embodiment, the microlaser assembly can also include a spacer material, such as air, undoped YAG or any other desired spacer, that fills, either completely or partially, the gap between adjacent ones of the microresonator and the electro-optic components. The spacer material can be selected to have an index of refraction that will appropriately alter the optical path of the laser signals such that the laser signals emitted by the microresonator or some other electro-optic component are presented at the desired angle to the subsequent electro-optic component. As will be apparent, the spacer material need not be inserted in all of the gaps and different types of spacer material having different indices of refraction can be inserted into different ones of the gaps.

The housing 12 is typically comprised of aluminum. As shown in FIG. 1, the housing can define windows 40, typically comprised of sapphire, through which the laser signals that are emitted via the first surface 28 of the microresonator 14 or an electro-optic component 16 are directed. As such, the housing preferably includes a respective window proximate each of a microresonator and the electro-optic components that are designed to emit laser signals.

The microlaser assembly 10 can incorporate a number of different techniques for disposing of the thermal energy generated during its operation. For example, the microlaser assembly can include thermoelectric coolers or the like for actively removing heat from the microresonator 14 and the other electro-optic components 16. In the illustrated embodiment, however, the pump source 18 and the combination of the microresonator and the electro-optic components are mounted upon first and second heat sinks 20, 22, respectively, for collecting the heat generated during operation. According to this embodiment, the microlaser assembly can also include a pair of impingement coolers 24, 26, one of which is associated with each heat sink for removing the thermal energy collected by the heat sink from the other components. Although the impingement cooler can be configured in many different manners, the impingement coolers of the illustrated embodiment are ring-shaped coolers that encircle the periphery of the respective heat sinks for drawing thermal energy therefrom. Alternatively, the heat sinks may themselves be impingement coolers by defining channels therethrough through which coolant is circulated.

The microlaser assembly 10 can therefore produce laser signals having a wide variety of signal characteristics, such as a wide variety of power levels and/or frequencies or wavelengths due to the variety of electro-optic components 16 that can be included. Regardless of the type of electro-optic components, however, the microresonator 14 and the electro-optic components can be assembled in a ring-like configuration such that the resulting components are densely packed, thereby permitting the microlaser assembly to be housed in a relatively small package. Notwithstanding the dense packing of the microresonator and the electro-optic components, the ring-like arrangement of the microresonator and the electro-optic components facilitates the alignment of the components, thereby reducing the signal loss or attenuation. In addition, the microlaser assembly of the present invention provides for the heat generated during operation of the microresonator, the electro-optic components and the pump source 18 to be efficiently extracted such that these components remain at a desired operating temperature.

Figure 8:
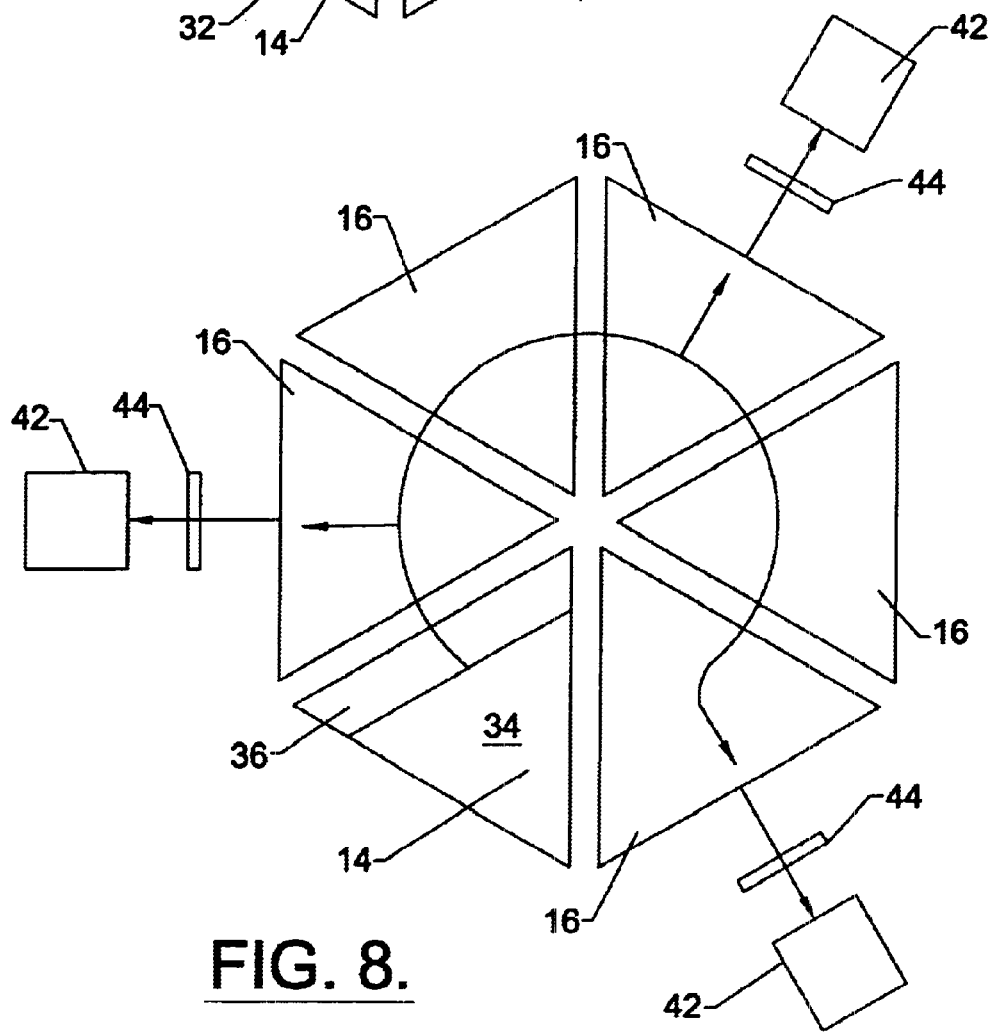
FIG. 8 is a top plan view of a wedge-shaped microresonator and a plurality of wedge-shaped electro-optic components that drive a plurality of auxiliary electro-optic components according to an alternative embodiment of the present invention.

As depicted in FIG. 8, the microlaser assembly 10 can also include additional auxiliary electro-optic components 42 that are not disposed within the ring-like configuration of the microresonator 14 and the primary electro-optic components 16, but that receive laser signals that have been emitted by one of the microresonator and the primary electro-optic components. Although not necessary for the practice of this aspect of the present invention, the auxiliary electro-optic components can be disposed outside of the housing 12 so as to receive laser signals emitted via one of the windows 40. As shown schematically in FIG. 8, for example, the auxiliary electro-optic components can be positioned proximate different ones of the primary electro-optic components in order to receive the laser signals emitted via the first surface of the respective electro-optic components and to appropriately modify the laser signals. The microlaser assembly of this embodiment can include a wide variety of auxiliary electro-optic components, including frequency altering components, such as frequency doublers or fourth harmonic generators, optical parametric amplifiers, optical parametric oscillators, active gain mediums, gain switched resonators and the like, depending upon the desired characteristics of the laser signals to be emitted by the microlaser assembly.

The microlaser assembly 10 of this embodiment can also include shutters 44 disposed upstream of the auxiliary electro-optic components 42 in order to controllably permit laser signals to reach the auxiliary electro-optic components. As such, the shutter will be closed in order to block the laser signals from reaching the respective auxiliary electro-optic component in instances in which the output from the auxiliary electro-optic components is not desired. Alternatively, the shutter will be open in instances in which the laser signals are to be provided to the respective auxiliary electro-optic component.

Additionally, the microlaser assembly 10 can include a plurality of different auxiliary electro-optic components 42 that can be alternately positioned downstream of the microresonator 14 and the electro-optic components 16 in order to receive the laser signals. For example, the variety of different auxiliary electro-optic components can be mounted in a cartridge or the like and a specific one of the electro-optic components could be selectively positioned so as to receive the laser signals emitted the microresonator or one of the primary electro-optic components. The microlaser assembly of this embodiment can therefore be easily configured to produce laser signals having a variety of different signal characteristics depending upon the particular electro-optic application.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A wedge-shaped microresonator having first, second and third side surfaces, the wedge-shaped microresonator comprising:
    an active gain medium having a wedge-shape;
    a passive Q-switch proximate at least one of the first, second and third side surfaces; and
    a reflective surface proximate each of the first, second and third side surfaces, wherein at least one of said reflective surfaces is only partially reflective to thereby permit emission of laser signals.

2. A wedge-shaped microresonator according to claim 1 wherein said active gain medium is proximate the first and third side surfaces and said passive Q-switch is proximate the second side surface.

3. A wedge-shaped microresonator according to claim 1 wherein said partially reflective surface is proximate the same side surface as said passive Q-switch.

4. A wedge-shaped microresonator according to claim 1 wherein said passive Q-switch is proximate each of the first, second and third side surfaces.

5. A microlaser assembly comprising:
    a microresonator comprising an active gain medium and a passive Q-switch for emitting laser pulses, wherein said microresonator comprises at least a pair of converging side surfaces that define an acute angle therebetween; and
    at least one electro-optic component for receiving and modifying the laser pulses emitted by said microresonator,
    wherein said microresonator includes a partially reflective surface to permit laser pulses to be output to said electro-optic component.

6. A microlaser assembly according to claim 5 wherein both said microresonator and said at least one electro-optic component are wedge-shaped and are arranged in a ring-like arrangement.

7. A microlaser assembly according to claim 6 further comprising an auxiliary electro-optic component for receiving an output from one of said microresonator and said electro-optic component, said auxiliary electro-optic component being radially offset from the ring-like arrangement of said microresonator and said at least one electro-optic component.

8. A microlaser assembly according to claim 5 further comprising a heat sink disposed in thermal communication with said microresonator and said at least one electro-optic component.

9. A microlaser assembly according to claim 8 further comprising a pump source for providing pump signals to said microresonator, said pump source also disposed in thermal communication with said heat sink.

10. A microlaser assembly according to claim 9 wherein said heat sink is positioned between said pump source and said microresonator and said at least one electro-optic component, wherein said heat sink defines at least one opening therethrough, and wherein said pump source is positioned relative to said heat sink so as provide pump signals through a respective opening to said microresonator.

11. A microlaser assembly according to claim 9 wherein said pump source comprises a plurality of pump sources arranged to pump said microresonator in order to establish a triangular pattern of resonation within said microresonator.

12. A microlaser assembly according to claim 5 wherein said at least one electro-optic component is selected from the group consisting of an optical parametric oscillator, an optical parametric amplifier, a frequency altering component, a gain switched resonator and another active gain medium.

13. A microlaser assembly comprising:
   a wedge-shaped microresonator comprising an active gain medium and a passive Q-switch for emitting laser pulses; and
   a plurality of pump sources arranged to pump said microresonator in order to establish a triangular pattern of resonation within said microresonator.

14. A microlaser assembly according to claim 13 wherein said microresonator comprises first, second and third side surfaces, and wherein said plurality of pump sources are arranged such that the triangular pattern extends between medial portions of the first, second and third side surfaces.

15. A microlaser assembly according to claim 13 further comprising a heat sink disposed in thermal communication with said microresonator and said plurality of pump sources.

16. A microlaser assembly according to claim 15 wherein said heat sink is positioned between said plurality of pump sources and said microresonator, wherein said heat sink defines at least one opening therethrough, and wherein said plurality of pump sources are positioned relative to said heat sink so as provide pump signals through respective openings to said microresonator.

17. A microlaser assembly according to claim 13 further comprising at least one electro-optic component for receiving and modifying the laser pulses emitted by said microresonator.

18. A microlaser assembly according to claim 17 wherein said microresonator and said at least one electro-optic component are arranged in a ring-like arrangement.

19. A microlaser assembly according to claim 18 further comprising an auxiliary electro-optic component for receiving an output from one of said microresonator and said electro-optic component, said auxiliary electro-optic component being radially offset from the ring-like arrangement of said microresonator and said at least one electro-optic component.

20. A microlaser assembly according to claim 17 wherein said at least one electro-optic component is selected from the group consisting of an optical parametric oscillator, an optical parametric amplifier, a frequency altering component, a gain switched resonator and another active gain medium.

* * * * *